United States Patent Office 3,151,167
Patented Sept. 29, 1964

3,151,167
PREPARATION OF KETONES FROM EPOXIDES
John L. Eisenmann, Braintree, and Raymond L. Yamartino, Wayland, Mass., assignors, by mesne assignments, to Diamond Alkali Company, Cleveland, Ohio, a corporation of Delaware
No Drawing. Filed Apr. 12, 1961, Ser. No. 102,359
8 Claims. (Cl. 260—586)

This invention relates to a novel chemical synthesis and, more particularly, to a process for the preparation of ketones by the catalytic isomerization or molecular rearrangement of epoxides.

It is known that alkylene alpha oxides, such as, for example, propylene oxide, may be isomerized to form the corresponding aldehyde. Processes of this nature are described, for example, in U.S. Patent Nos. 2,503,050, 2,601,538 and 2,660,609. In processes such as described in the aformentioned patents, the molecular rearrangement occurs predominantly towards the alpha carbon atom to form the corresponding aldehyde. If any ketone is formed by such processes, it is produced in insignificant amounts, say, for example, 2% or less, and is regarded as an undesired reaction product. As far as is known, no one has heretofore been able to prepare ketones in significant yield by the catalytic isomerization of alpha epoxides.

One object of this invention is therefore to prepare ketones by the catalytic isomerization of epoxides.

Another object is to prepare ketones in a simple and efficient manner without the need of high temperatures and/or pressures.

Yet another object is to prepare ketones in good yield by the isomerization of epoxides in the presence of a dinuclear carbonyl catalyst and a suitable alkanol.

Other objects of this invention will in part be obvious and will in part appear hereinafter.

As was indicated previously, all known processes of isomerizing alpha epoxides have heretofore produced the corresponding aldehyde. It has now been found quite unexpectedly that epoxides can be catalytically isomerized by a dinuclear carbonyl catalyst in the presence of a suitable alkanol to form the corresponding ketone. The reaction may be performed at room temperature and ordinary pressures, thereby obviating the necessity for expensive equipment and careful control of processing conditions. Apart from the obvious advantages resulting from the reaction being performed at ambient temperatures and pressures, the isomerization of epoxides in accordance with the practice of this invention affords the further advantage of utilizing starting materials that are readily available in relatively pure form.

Prior commercial procedures for preparing ketones, such as by the oxidation of a secondary alcohol, often make use of starting materials which are in fact mixtures of various compounds, thereby forming a plurality of reaction products along with the desired ketone. Apart from affecting the total yield, isolation or separation of the desired ketone in substantially pure form is, at best, difficult. Contrasted to the aforementioned difficulties, the present invention utilizes starting materials which are readily available in substantially pure form and which may be simply and efficiently converted into the corresponding ketone which in turn is easily separated from the reaction mixture by conventional techniques.

The epoxides which may be used in the practice of this invention may be any of the compounds of the formula:

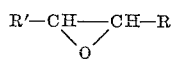

wherein R may be hydrogen, alkyl or alkenyl, and R' may be alkyl or alkenyl; or alicyclic derivatives thereof wherein for example, R and R' may together form a cycloalkylene radical.

As used herein, the terms "alkyl" and "alkenyl" are intended to include substituted derivatives thereof, such as, for example, aralkyl, and derivatives wherein one or more hydrogen atoms are replaced by various substituents such as hydroxy or amine groups, etc.

In the preferred embodiments, R is hydrogen or methyl and R' is a lower alkyl radical such as methyl, ethyl, etc.

As an illustration of useful compounds within the above formula, mention may be made of propylene oxide and the n-butylene oxides (1,2- and 2,3-butylene oxide). As an example of an alicyclic compound useful in the practice of this invention, mention may be made of cyclohexene oxide.

As was mentioned previously, the process of this invention comprises essentially the concept of reacting epoxides such as those described above with a dinuclear carbonyl catalyst in the presence of an alkanol.

As examples of dinuclear carbonyl catalysts useful in the practice of this invention, mention may be made of dimetallic octacarbonyls such as dicobalt octacarbonyl, dirhodium octacarbonyl and diiridium octacarbonyl, the preferred catalyst being dicobalt octacarbonyl.

The alkanols useful in the practice of this invention are preferably primary and secondary mono- and dihydroxy-substituted lower alkanes. As examples of such alkanols, mention may be made of methanol, isopropanol, primary and secondary butanol, heptanol, ethylene glycol, etc. Particularly good results have been obtained with methanol.

The invention may be described in more detail by illustrating how propylene oxide, for example, may be isomerized to form acetone.

Dicobalt octacarbonyl ([Co(CO)$_4$]$_2$) is dissolved in a suitable alkanol such as, for example, methanol, thereby evolving carbon monoxide gas. The solution is allowed to stand, say, for example, for one hour, until substantially no more carbon monoxide is liberated. Propylene oxide is then added to the solution and acetone is formed according to the followin reaction:

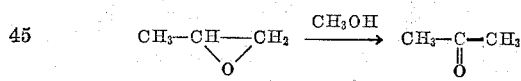

The above reaction, which is initiated at room temperature, is quite exothermic and produces a 75% or more yield of acetone.

While I do not wish to be limited to any particular theory, it is believed that the isomerization or molecular rearrangement whereby the ketone is formed may be explained as follows:

When a dinuclear carbonyl catalyst such as dicobalt octacarbonyl is dissolved in the alkanol, a complex is formed along with the evolution of carbon monoxide, according to the following equation:

3[Co(CO)$_4$]$_2$+12 alkanol→
            2[Co(alkanol)$_6$]$^{++}$[Co(CO)$_4$]$_2^-$+CO↑

Isomerization is believed to take place when the propylene oxide replaces the alkanol as coordinating molecule in the hexacoordinated cobalt cation Co(alkanol)$_6^{++}$, and the alkanol in turn displaces the coordinated propylene oxide in its rearranged form to wit, acetone.

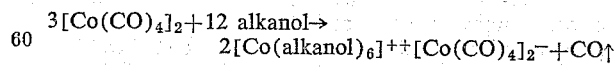

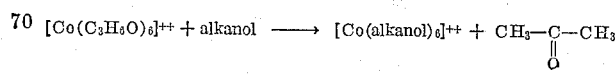

The acetone may be readily recovered from the reaction mixture by conventional distillation and filtration procedures.

In the preferred embodiment, the reaction is carried out in an inert atmosphere such as, for example, in an atmosphere of carbon monoxide, nitrogen, argon, helium, etc., to prevent decomposition of the catalyst. While such an inert atmosphere is not necessary to the practice of this invention, it has been found that the total yield of ketone may be increased in this manner.

Where the dinuclear carbonyl catalyst is not readily soluble in the alkanol or when otherwise found desirable or expedient to do so, it is also within the scope of the invention to utilize a suitable inert solvent for the catalyst which is also miscible with the alkanol. By "inert solvent" is meant any organic solvent, such as benzene, toluene, petroleum ether, etc., which is chemically inert both to the reactants and to the reaction products. Such solvents are well known in the art and comprise no part of this invention per se.

The following examples show by way of illustration and not by way of limitation the novel process of this invention. It is expressly understood that the invention is not limited to the compounds, proportions, and other operating conditions recited therein.

*Example 1*

One gram of dicobalt octacarbonyl was dissolved in 20 ml. of methanol, and carbon monoxide gas was evolved. When the gas ceased bubbling, 20 grams of propylene oxide were added and the reaction mixture was stirred for two hours. Upon distillation of the reaction mixture, a 40% yield of acetone was recovered.

*Example 2*

1.5 grams of dicobalt octacarbonyl were dissolved in 30 grams of methanol under a blanket of nitrogen. After evolution of carbon monoxide ceased, 20 grams of propylene oxide were added with stirring. After a short induction period, the temperature of the reaction rose rapidly to 65° C. When the exothermic action had ceased, the mixture was distilled and a 75% yield of acetone was recovered.

*Example 3*

1.8 grams of dirhodium octacarbonyl were dissolved in 25 grams of ethylene glycol and the solution was stirred until evolution of gas ceased. 20 grams of 1,2-butylene oxide were then added with continuous stirring, the mixture being maintained under a nitrogen blanket. The temperature of the reaction mixture rose to approximately 50° C. After the exothermic action had subsided, the mixture was distilled and a 77% yield of methyl ethyl ketone was recovered.

*Example 4*

1.3 grams of dicobalt octacarbonyl were dissolved in 20 ml. of n-butanol, and carbon monoxide gas was evolved. When the evolution of gas ceased, 10 grams of "Butylene Oxide S" (Dow Chemical Company—a mixture of 1,2- and 2,3-butylene oxides) were then added. A nitrogen atmosphere was maintained during both of the above reactions. After the reaction was completed, the solution was distilled and a 78.8% yield of methyl ethyl ketone was recovered.

*Example 5*

1.3 grams of diiridium octacarbonyl were dissolved in 20 grams of methanol. After the gas bubbling ceased, 10 grams of cyclohexene oxide were added under a nitrogen atmosphere. As in all of the above examples, this reaction was exothermic. After cooling, the mixture was distilled and a 73% yield of cyclohexanone was recovered.

*Example 6*

0.5 gram of dicobalt octacarbonyl were dissolved in 15 ml. of isopropanol. After two hours, 5 ml. of propylene oxide were added under a nitrogen blanket. When the exothermic action subsided and the mixture cooled down, it was then distilled to obtain a 75% yield of acetone.

It is to be expressly understood that the invention is not limited to the proportions, ingredients or other operating conditions recited in the foregoing specific examples. The proportions of the reactants are not critical and may vary over a wide range. While the temperature of reaction is not critical, the reaction is preferably carried out at room temperature due to the exothermic nature of the reaction.

Isomerization of epoxide to ketone may be effected, at least to some extent, by carrying out the foregoing examples in the absence of alkanol. In other words, the epoxide and the dinuclear carbonyl catalyst may be dissolved in a suitable inert solvent, such as those heretofore described, to effect, in part, a molecular rearrangement of the epoxide to ketone. However, if the reaction is carried out in the absence of alkanol, the yield is poor, say for example, 10% or less. Therefore, while it is possible to recover some amount of ketone merely by forming a solution of epoxide and catalyst, in accordance with the practice of this invention, the reaction is carried out in the presence of an alkanol in the manner described previously.

What is claimed is:
1. A process for the preparation of a ketone of the formula

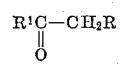

from an epoxide of the formula

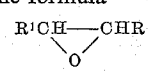

wherein R is selected from the group consisting of hydrogen, alkyl and alkenyl and $R^1$ is selected from the group consisting of alkyl and alkenyl, and wherein R and $R^1$ may together form a cycloalkylene radical; which process comprises adding said epoxide to an alkanol solution of a catalyst selected from the group consisting of dicobalt, dirhodium and diiridium octacarbonyls, thereby effecting a molecular rearrangement of said epoxide to said ketone.

2. The process as defined in claim 1 wherein said alkanol is methanol.

3. The process as defined in claim 1 wherein said reaction is carried out in an inert atmosphere.

4. The process as defined in claim 1 wherein said catalyst is dicobalt octacarbonyl.

5. The process as defined in claim 1 wherein said epoxide is an alpha epoxide.

6. The process which comprises reacting propylene oxide with solution comprising dicobalt octacarbonyl and an alkanol to form acetone.

7. The process which comprises reacting at least one n-butylene oxide with a solution comprising dicobalt octacarbonyl and an alkanol to form methyl ethyl ketone.

8. The process which comprises reacting cyclohexene oxide with a solution comprising dicobalt octacarbonyl and an alkanol to form cyclohexanone.

References Cited in the file of this patent

Migrdichian Organic Synthesis, vol. I, pages 90–91 (1957).

UNITED STATES PATENT OFFICE
CERTIFICATE OF CORRECTION

Patent No. 3,151,167            September 29, 1964

John L. Eisenmann et al.

It is hereby certified that error appears in the above numbered patent requiring correction and that the said Letters Patent should read as corrected below.

Column 2, line 43, for "followin" read -- following --; lines 44 to 47, the structure should appear as shown below instead of as in the patent:

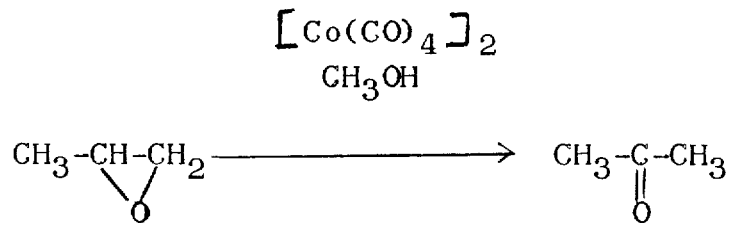

column 4, line 46, for "analkanol" read -- an alkanol --; line 60, after "with" insert -- a --.

Signed and sealed this 9th day of February 1965.

(SEAL)
Attest:

ERNEST W. SWIDER            EDWARD J. BRENNER
Attesting Officer            Commissioner of Patents